(12) United States Patent
Hilberer

(10) Patent No.: US 8,616,231 B2
(45) Date of Patent: Dec. 31, 2013

(54) VALVE DEVICE FOR A COMPRESSED AIR SUPPLY DEVICE AND COMPRESSED AIR SUPPLY SYSTEM

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 572 days.

(21) Appl. No.: 12/525,622

(22) PCT Filed: Feb. 7, 2008

(86) PCT No.: PCT/EP2008/000937
§ 371 (c)(1),
(2), (4) Date: Jun. 22, 2010

(87) PCT Pub. No.: WO2008/095703
PCT Pub. Date: Aug. 14, 2008

(65) Prior Publication Data
US 2010/0269926 A1    Oct. 28, 2010

(30) Foreign Application Priority Data

Feb. 7, 2007  (DE) .......................... 10 2007 005 987

(51) Int. Cl.
*G05D 11/00* (2006.01)
(52) U.S. Cl.
USPC ......... 137/110; 137/239; 137/309; 137/487.5
(58) Field of Classification Search
USPC ............. 137/98, 109, 110, 111, 114, 115.07, 137/115.13, 115.19, 115.23, 118.06, 239, 137/309, 487.5, 625.69, 625.37, 625.28, 137/625.38, 625.68
See application file for complete search history.

(56) References Cited

U.S. PATENT DOCUMENTS 5,111,840 A   5/1992   Miller et al.
5,678,900 A   10/1997  Blanz
(Continued)

FOREIGN PATENT DOCUMENTS

DE    32 13 236 A1    6/1983
DE    692 10 232 T2   9/1996
(Continued)

OTHER PUBLICATIONS

International Search Report dated Jul. 22, 2008 including English translation (Four (4) pages).

(Continued)

Primary Examiner — Craig Schneider
Assistant Examiner — Jessica Cahill
(74) Attorney, Agent, or Firm — Crowell & Moring LLP

(57) ABSTRACT

A valve device for a compressed air supply system, includes a control chamber to which compressed air may be supplied, a control piston plate delimiting the control chamber, a control piston that is fixed to the side of the control piston plate facing away from the control chamber. The piston protrudes into a discharge valve chamber of a discharge valve, provided with at least one compressed air connection. A valve head delimits the discharge valve chamber, which can be pressurized with the force of a spring in the direction of a valve seat and which can be lifted from the valve seat by the control piston counter to the force of the spring in order to open the discharge valve. The control piston and a valve housing surrounding the control piston define at least two regeneration valve chambers of a regeneration valve having at least one compressed air connection. The at least two regeneration valve chambers are either separated from each other or connected together in accordance with the position of the control piston.

10 Claims, 6 Drawing Sheets

(56) References Cited

U.S. PATENT DOCUMENTS

| | | | |
|---|---|---|---|
| 6,041,808 A * | 3/2000 | Blanz | 137/118.06 |
| 6,540,308 B1 | 4/2003 | Hilberer | |
| 7,080,891 B1 | 7/2006 | Hilberer | |
| 2003/0209267 A1* | 11/2003 | Heer | 137/118.06 |
| 2003/0209268 A1* | 11/2003 | Heer | 137/118.06 |
| 2004/0012249 A1* | 1/2004 | Koelzer | 303/3 |
| 2006/0081299 A1* | 4/2006 | Koo et al. | 137/625.69 |

FOREIGN PATENT DOCUMENTS

| | | |
|---|---|---|
| DE | 197 14 484 A1 | 10/1998 |
| DE | 198 35 638 A1 | 2/2000 |
| DE | 199 36 283 A1 | 2/2001 |
| DE | 10 2004 021 242 A1 | 11/2005 |
| EP | 0 075 105 B1 | 3/1983 |
| EP | 1 508 488 A1 | 2/2005 |
| EP | 1 508 488 B1 | 2/2005 |

OTHER PUBLICATIONS

German Office Action dated May 18, 2009 including English translation (Sixteen (16) pages).

PCT/IB/338 (One (1) page); PCT/IB/326 (One (1) page); PCT/IB/373 (Two (2) pages); PCT/ISA/237 including English translation (Ten (10) pages), (2009).

* cited by examiner

VALVE DEVICE FOR A COMPRESSED AIR SUPPLY DEVICE AND COMPRESSED AIR SUPPLY SYSTEM

BACKGROUND AND SUMMARY OF THE INVENTION

The invention relates to a valve device for a compressed air supply system of a utility vehicle, and to a compressed air supply system having a valve device of said type.

Utility vehicles having pneumatic components require a compressed air supply system. The compressed air is generally fed by a compressor into an air treatment system where the air which is introduced is cleaned in a filter unit before then finally being supplied via a multi-circuit protective valve for use, for example to the brake system of the utility vehicle.

After certain feed quantities are reached or after certain periods of time have elapsed, it is necessary to clean the filter unit. For this purpose, a regeneration solenoid valve is connected within the air treatment system in such a way that compressed air from storage tanks, either the storage tanks of the service brake circuit or one or more storage tanks provided especially for the purpose, flows through the regeneration solenoid valve and in the reverse direction through the filter unit, before then being allowed to flow, laden with moisture and foreign particles, out of the filter unit and into the atmosphere. During the regeneration phases, the compressor is generally shut off or placed into an idle phase.

It is generally sought for the air drying to take place in as effective and efficient a manner as possible, with this requiring in particular a good utilization of the volume available in the air dryer cartridge. This also relates to the regeneration capacity of the system, wherein the dry air which is supplied to the air dryer cartridge for the purpose of regeneration must be provided in a sufficient quantity.

The object on which the invention is based is that of providing a compressed air supply device with an improved regeneration capacity and an increased degree of integration. The object is achieved by a valve device and compressed air supply system having the valve device according to the invention. Advantageous embodiments of the invention are described herein.

The invention encompasses a valve device for a compressed air supply system, having a control chamber which can be charged with compressed air, a control piston plate which delimits the control chamber, a control piston which is attached to that side of the control piston plate which faces away from the control chamber, which control piston projects into a blow-off valve chamber, which is provided with at least one compressed air port, of a blow-off valve, and a valve plate which delimits the blow-off valve chamber and which can be acted on with force in the direction of a valve seat by a spring and which can be lifted up from the valve seat, in order to open the blow-off valve, by the control piston counter to the force of the spring. The control piston and a valve housing which surrounds the control piston define at least two regeneration valve chambers of a regeneration valve with, in each case, at least one compressed air port, and with the at least two regeneration valve chambers either being separated from one another or connected to one another as a function of the position of the control piston.

In this way, a valve device is provided which has a pneumatically activatable regeneration valve. It is hereby possible to utilize considerably higher regeneration air rates than with regeneration solenoid valves, such that it is in particular also possible to regenerate filter units which have a high filter capacity. Here, reference is made in particular to filter units which have a labyrinthine construction, such that the air to be dried and also the regeneration air cover a large distance through the filter unit. The regeneration air quantity required for such filter units can be provided in a simple manner by way of the valve device according to the invention. At the same time, the valve device according to the invention is particularly expedient on account of an integration of the blow-off valve and regeneration valve. It is sufficient to provide a single control chamber, by means of the pressurization of which both the regeneration valve can be switched and also the blow-off valve can be opened.

It is expediently provided that the regeneration valve chambers are separated from one another when the blow-off valve is closed and are connected to one another when the blow-off valve is open. The regeneration is thus automatically initiated whenever the blow-off valve is opened. Conversely, a regeneration takes place every time the blow-off valve is opened.

Provision may be made for the control piston to have at least one constriction which, in a first position of the control piston, is situated entirely within one of the regeneration valve chambers and, in a second position of the control piston, creates a connection between the at least two regeneration valve chambers. The control piston therefore has a dual function. The control piston firstly acts as a tappet with respect to the blow-off valve; and the control piston secondly has, over the constriction, a control device which enables the regeneration valve function.

Provision may likewise be made for the control piston, which defines an axis by its extent between the control piston plate and the blow-off valve chamber, to have at least one duct with at least two duct openings situated axially offset with respect to one another. The at least two duct openings which are situated axially offset with respect to one another are situated in one of the regeneration valve chambers in a first position of the control piston and are situated in different regeneration valve chambers, such that the duct creates a connection between the at least two regeneration valve chambers, in a second position of the control piston.

The invention is expediently refined in that the control piston is separate from the valve plate. It may likewise be provided that the control piston is formed in one piece with the valve plate.

The invention is expediently refined in that the blow-off valve chamber has at least one second compressed air port. The feed line which is connected indirectly or directly to the compressor is connected to the blow-off valve at the second compressed air port. During the feed phase, the compressed air therefore flows through the blow-off valve chamber with the blow-off valve closed, while in the regeneration phase, an outflow of the air out of the blow-off valve chamber is enabled.

It is expediently provided that the regeneration valve and the blow-off valve are arranged in the same valve housing. This provides a particular degree of integration.

The invention also encompasses a compressed air supply system having a valve device with a control chamber which can be charged with compressed air, a control piston plate which delimits the control chamber, a control piston which is attached to that side of the control piston plate which faces away from the control chamber, which control piston projects into a blow-off valve chamber, which is provided with at least one compressed air port, of a blow-off valve, and a valve plate. The valve plate delimits the blow-off valve chamber and can be acted on with force in the direction of a valve seat by a spring. The valve plate can be lifted up from the valve seat, in order to open the blow-off valve, by the control piston counter to the force of the spring, with the control piston and a valve housing which surrounds the control piston defining at least two regeneration valve chambers of a regeneration valve with in each case at least one compressed air port. At least two regeneration valve chambers either are separated from one another or connected to one another as a function of the position of the control piston. It is possible for the control chamber to be activated by a solenoid valve. The at least one compressed air port of the blow-off valve chamber is connected to a compressed air inlet of a filter unit, and the regeneration valve chambers are connected to in each case one port of a non-return valve which is connected to a compressed air outlet of the filter unit.

It is expediently provided that a second compressed air port of the blow-off valve chamber is connected to a compressed air source.

The invention will now be explained by way of example below with reference to the appended drawings on the basis of particularly preferred embodiments. In the drawings:

DETAILED DESCRIPTION OF THE DRAWINGS

Figure 1:
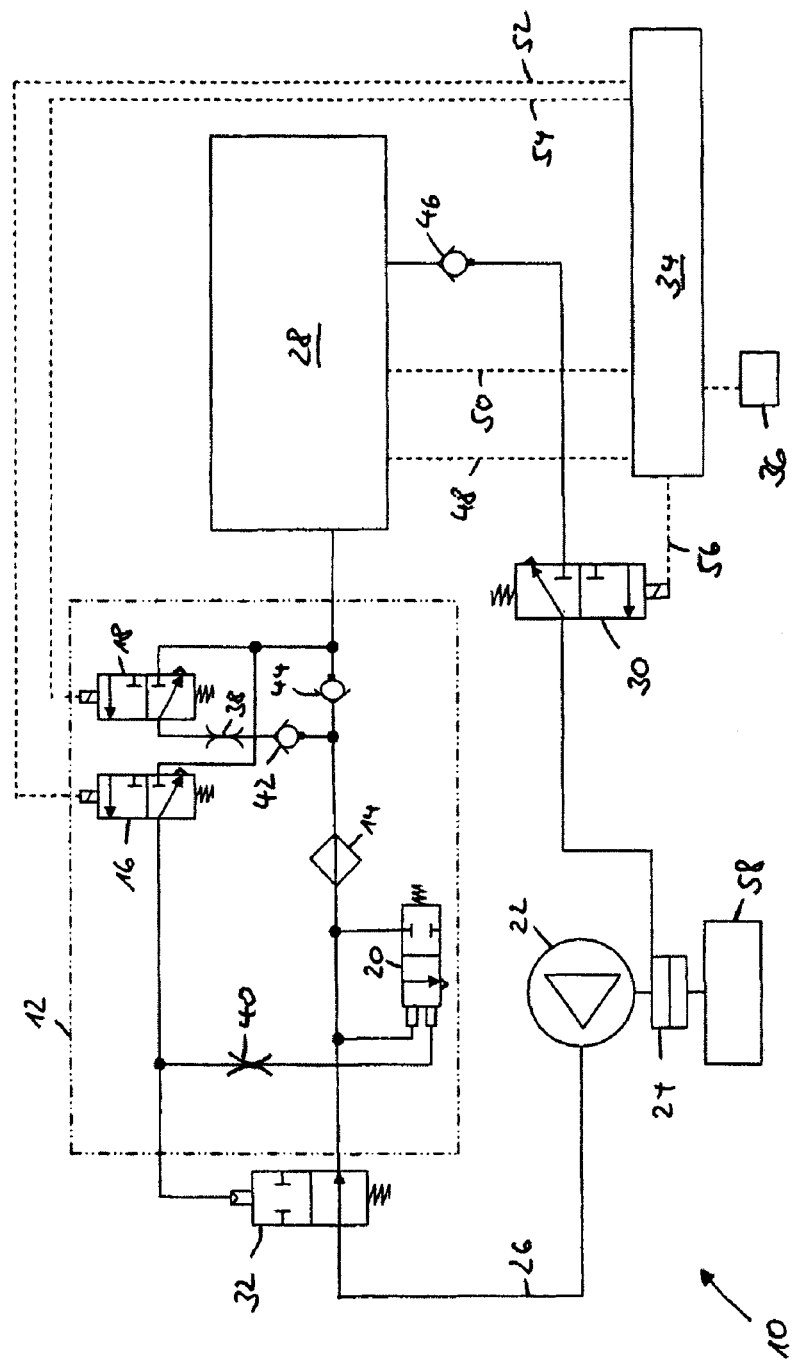
FIG. 1 is a schematic illustration of a first embodiment of a compressed air supply system.

In the following description of the drawings, the same reference numerals are used to denote identical or similar components.

FIG. 1 shows a schematic illustration of a first embodiment of a compressed air supply system. The compressed air supply system 10 includes, as essential components, an air dryer unit 12, a multi-circuit protective valve unit 28, a compressor 22 with a coupling 24, a compressor coupling switching valve unit 30, and a feed line shut-off valve unit 32, which is arranged in a feed line 26 between the compressor 22 and the air dryer unit 12. The air dryer unit 12 includes pneumatically and electrically activatable components, but the electronic control unit 34, which serves inter alia to activate the electrically activatable components which are provided in the air dryer unit 12, is arranged externally. As an air dryer unit 12, which may range systematically from a purely pneumatic air dryer unit to a fully integrated electronic air treatment system (EAC), an air dryer unit of this type is also referred to as a semi-dryer.

The air dryer unit 12 includes a first electrically activatable valve unit 16 which is embodied as a 3/2-way valve, a second electrically activatable valve unit 18 which is likewise embodied as a 3/2-way valve, and a pneumatically activatable blow-off valve unit 20, which is designed as a 2/2-way valve. A filter unit 14 is also provided within the air dryer unit 12. Further components include two throttles 38, 40 and two non-return valves 42, 44.

The air dryer unit 12 is connected at its outlet side to a multi-circuit protective valve unit 28 in which are provided, in particular, overflow valves in order to protect the different compressed air consumer circuits from one another and ensure a predefined filling sequence. The multi-circuit protective valve unit 28 has a plurality of compressed air outlets, with the illustration showing only that compressed air outlet which leads via a non-return valve 46 to a compressor coupling switching valve unit 30 which is designed as a 3/2-way valve. The compressor coupling switching valve unit 30 is then in turn connected to the compressor coupling 24 such that the compressor coupling 24 may be coupled or separated depending on the switching state of the compressor coupling switching valve unit 30. The electronic control unit 34 receives various input signals, for example from pressure sensors which are installed in the multi-circuit protective valve unit 28. Corresponding signal lines 48, 50 are illustrated by way of example. The electronic control unit 34 also receives temperature information from a temperature sensor 36. The first electrically activatable valve unit 16, the second electrically activatable valve unit 18 and the compressor coupling switching valve unit 30 are activated by way of signal lines 52, 54, 56 which are connected to output signal ports of the control unit 34.

The valve positions shown in FIG. 1 are those which are assumed during a normal feed phase of the compressed air supply system. In this feed phase, the compressor coupling 24 couples the compressor 22 to the internal combustion engine 58 of the utility vehicle, such that compressed air is fed via the feed line 26 and the feed line shut-off valve unit 32 into the air dryer unit 12. The compressed air flows onward through the filter unit 14 and through the non-return valve 44 before then being conducted to the multi-circuit protective valve unit 28, from where the compressed air can be provided to the individual consumer circuits. If it is now established by way of a pressure measurement, communicated for example by the signal lines 48, 50, that a deactivation pressure threshold has been reached, then the control unit 34 triggers a switch of the compressor coupling switching valve unit 30. In this way, a control inlet of the compressor coupling 24 is connected by way of the non-return valve 46 to a compressed air outlet of the multi-circuit protective valve 28, such that the compressor coupling 24 is separated. The compressed air supply system is therefore placed into an energy-saving operating state.

Furthermore, by switching the first electrically activatable valve unit 16 within the air dryer unit 12, it is possible to trigger an opening of the blow-off valve unit 20. At the same time, however, as a result of the switching of the first electrically activatable valve unit 16, the feed line shut-off valve unit 32 is also switched, such that the feed line 26 is separated from the air dryer unit 12. The pressure in the feed line 26 is consequently maintained despite the blow-off valve unit 20 being open.

Proceeding from that state, a regeneration of the filter unit 14 can take place if required specifically by virtue of the second electrically activatable valve unit 18 of the air dryer unit 12 being switched. A switch of the valve unit 18 causes the non-return valve 44 to be bypassed via the non-return valve 42, such that compressed air can flow out of the consumer circuits via the multi-circuit protective valve 28, the second electrically activatable valve unit 18, the non-return valve 42, the filter unit 14 and the blow-off valve 20. A further operating state may be assumed as a function of the temperature determined by the temperature sensor 36. To prevent the moist compressed air which is present in the feed line 26 from causing the feed line and/or the feed line shut-off valve unit 32 to freeze, the compressed air must be renewed from time to time at low temperatures. This is achieved by virtue of the compressor 22 being placed into its feed phase, and the feed line shut-off valve unit 32 being placed into its throughflow position, despite a lack of demand for compressed air. Since, in this state, the blow-off valve 20 is positively closed because it is activated in parallel with the feed line shut-off valve unit 32, the compressor 22 feeds air and causes an increase in the system pressure. Consequently, no compressed air is lost during the brief renewal of the feed line volume. However, it should be mentioned in connection with the embodiment in FIG. 1 that, upon the commencement of the non-feed phase, on account of the associated switching of the blow-off valve unit 20, the air volume between the feed line shut-off valve unit 32 and the non-return valve 44 is depressurized in any case; in particular, therefore, the pressure which is stored in the filter unit 14 is lost.

Figure 2:
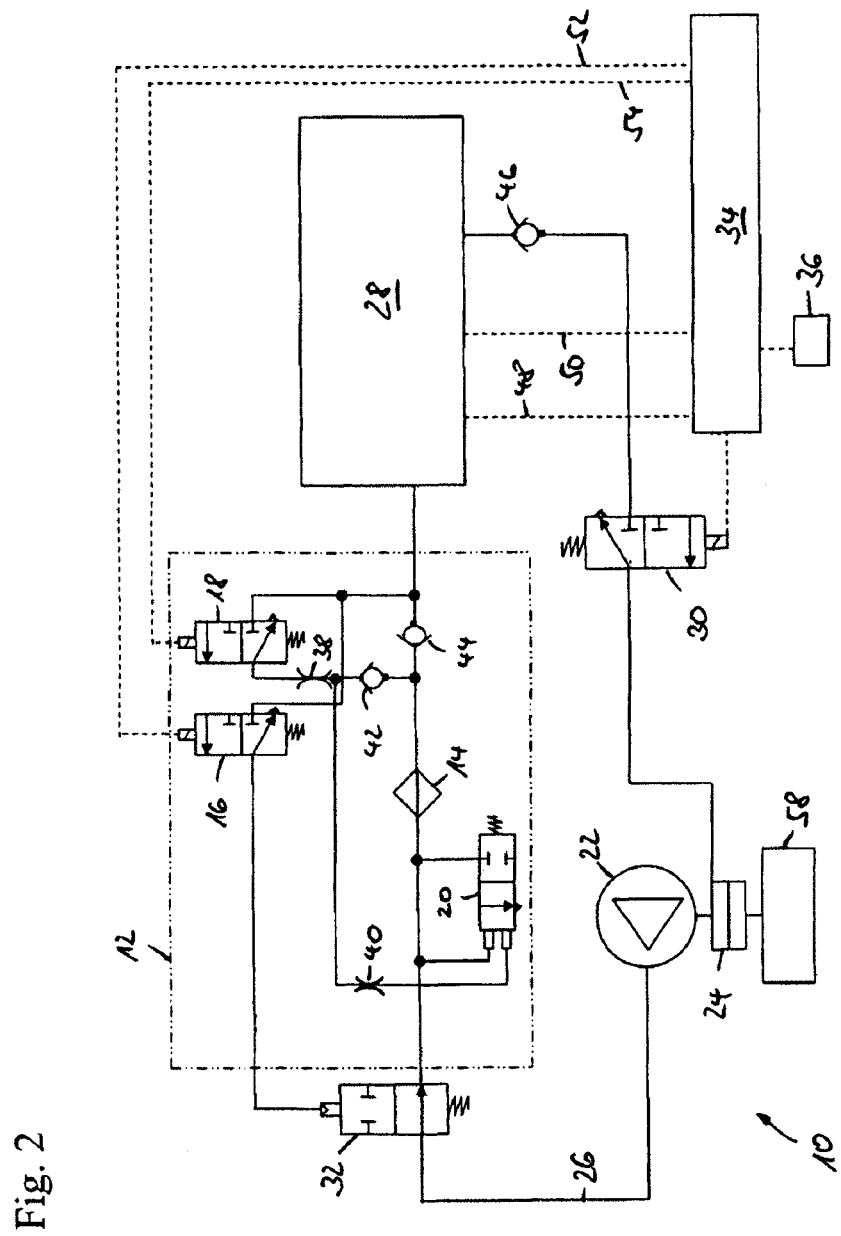
FIG. 2 is a schematic illustration of a second embodiment of a compressed air supply system.

FIG. 2 shows a schematic illustration of a second embodiment of a compressed air supply system. The compressed air supply system 10 illustrated here corresponds, in many details, to the system described in connection with FIG. 1. Only the pneumatic activation of the blow-off valve unit 20 with regard to the electrically activatable valve units 16, 18 differs. Specifically, in FIG. 2, the blow-off valve unit 20 is switched by the second electrically activatable valve unit 18, that is to say always in connection with a regeneration of the filter unit 14. This has the advantage over the system according to FIG. 1 that, in the non-feed phase, not only is the compressed air volume in the feed line 26 maintained but rather also the compressed air volume is stored between the feed line shut-off valve unit 32 and the non-return valve 44. Only when a regeneration is initiated by way of a switch of the second electrically activatable valve unit 18 is the blow-off valve 20 opened, and the pressure loss which is desired in this case takes place. If the volume in the feed line 26 must be renewed on account of low temperatures, then the feed line shut-off valve unit 32 must be moved into its open position, the compressor 22 must be set in operation and it is necessary to switch the blow-off valve 20 by switching the second electrically activatable valve unit 18. A brief regeneration therefore inevitably occurs even if possibly not required. A brief regeneration of this type may however be acceptable since, as a result of the decoupling of the switching processes of the feed line shut-off valve unit 32 and of the blow-off valve unit 20, it is possible to obtain a considerable saving of compressed air during the non-feed phase.

In the embodiment in FIG. 2, the feed line shut-off valve unit 32 fulfills its purpose in particular during the regeneration phases of the compressed air supply system 10. Specifically, the blow-off valve 20 is opened then, which, without a feed line shut-off valve unit 32, would lead to a pressure loss in the feed line 26. It is thus conceivable to move the feed line shut-off valve unit 32 into its state in which it blocks the feed line 26 only when a regeneration is impending or initiated because, outside the regeneration phases, the pressure path between the compressor 22 and the non-return valve 44 is closed off. Accordingly, it is even possible to dispense with the first electrically activatable valve unit 16 entirely and to also control the feed line shut-off valve unit 32 by way of the second electrically activatable valve unit. In this case, the transition from the feed phase into the non-feed phase would be brought about exclusively by virtue of the compressor coupling switching valve unit 30 being switched so as to deactivate the compressor 22. The feed line shut-off valve unit 32 would in particular remain open. Only when a regeneration is to take place is the second electrically activatable valve unit 18 switched, which would result in the feed line 26 being shut off by the feed line shut-off valve unit 32 and in the blow-off valve 20 being opened.

In FIG. 2, the control pressure connection to the blow-off valve 20 connects between the throttle 38 and the non-return valve 42. It is likewise possible for said connection to be arranged between the throttle 38 and the valve unit 18.

Figure 3A:
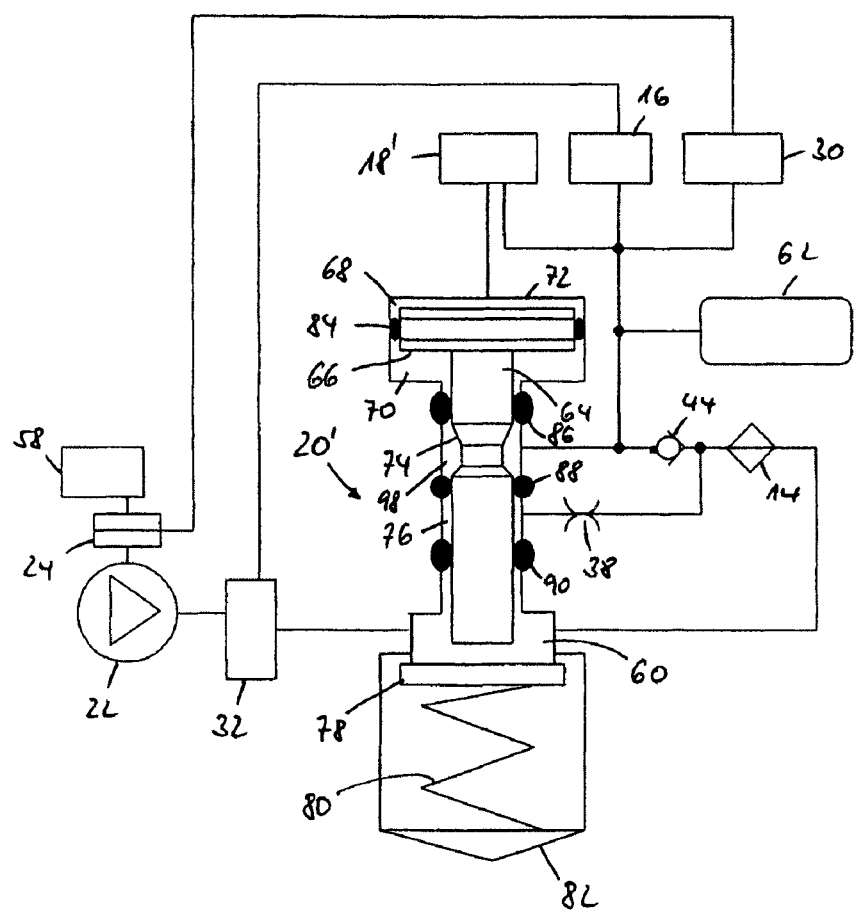
FIG. 3a is a schematic axial section view through a first embodiment of a valve device according to the invention and components connected thereto.

FIG. 3a shows a schematic axial section through a first embodiment of a valve unit according to the invention, which may advantageously be used in connection with the present invention. With the blow-off valve 20' illustrated here, it is possible for the blow-off function and the provision of a regeneration air path to be combined in a special way. With regard to the switching logic, the circuit illustrated in FIG. 3 corresponds to that in FIG. 2, that is to say the blow-off function and the regeneration function are positively coupled to one another, while the switching of the feed line shut-off valve unit 32 may take place completely independently of these.

In the switching state which is illustrated, compressed air can be fed by the compressor 22 via the feed line shut-off valve unit 32. The compressed air which is fed in this way flows through a valve chamber 60 of the blow-off valve unit 20' and from there via the filter unit 14 and via the non-return valve 44 to the consumers which are symbolized here by a compressed air tank 62, wherein it is self-evidently possible for a multi-circuit protective valve device to also be interposed. The system pressure which is present downstream of the non-return valve 44 may then be utilized by the compressor coupling switching valve unit 30, the first electrically activatable valve unit 16 and the second electrically activatable valve unit 18' to provide control pressures for the compressor coupling 24, the feed line shut-off valve unit 32 and the blow-off valve unit 20'.

The blow-off valve unit 20' includes a control piston. An end-mounted control piston plate 66 separates a control chamber 68, which is connected to the second electrically activatable valve unit 18', from a rear chamber 70 by means of a seal 84 which interacts with a valve housing 72. The rear chamber 70 includes a ventilation opening (not illustrated) in order to enable an unhindered movement of the control piston 64. The control piston 64 also has a constriction 74, with the control piston being sealed off, at both sides of the constriction 74 by means of seals 86, 88, with respect to the adjacent chambers which surround the control piston 64. The valve chamber which surrounds the constriction 74 is therefore sealed off, as a first regeneration valve chamber 98, with respect to the rear chamber 70 of the control piston plate 66 and with respect to a second regeneration valve chamber 76. The second regeneration valve chamber 76 is separated from the abovementioned valve chamber 60 by a further seal 90. The valve chamber 60 is delimited by a valve plate 78, which is pressed against a valve seat by a spring 80. In this way, the valve plate 78 seals off the valve chamber 60 with respect to an outlet 82.

The blow-off valve 20' therefore includes a total of five seals, specifically the valve seat which interacts with the valve plate 78 and the seals 84, 86, 88, 90 which are embodied as O-rings and which interact with the valve housing 72 and seal off the control chamber 68, rear chamber 70, first regeneration valve chamber 98, second regeneration valve chamber 76 and valve chamber 60 with respect to one another.

In the switching state illustrated in FIG. 3, the second electrically activatable valve unit 18' ventilates the control chamber 68. The valve plate 78 seals off the valve chamber 60 with respect to the outlet 82, and the seal 88 seals off the region downstream of the non-return valve 44, that is to say the compressed air consumer side, with respect to the air path, which is provided with a throttle 38, to the filter unit 14. If the second electrically activatable valve unit 18 is now activated such that the control chamber is ventilated, said second electrically activatable valve unit 18 moves the control piston 64. This has the result that firstly the control piston lifts the valve plate 78 up from the valve seat, such that the valve chamber 60 is connected to the outlet 82, and secondly the chamber 98 surrounding the constriction 74 now provides a connection between the consumer side, that is to say in the region downstream of the non-return valve 44, and the filter unit 14. Since the outlet is open in this state, it is possible for compressed air to flow back from the consumer side to the outlet via the filter unit. The blow-off valve 20' thus combines the blow-off function with a 2/2-way valve function for providing a regeneration air path. In the present exemplary embodiment, the 2/2-way valve function is realized by way of a constriction.

Figure 3B:
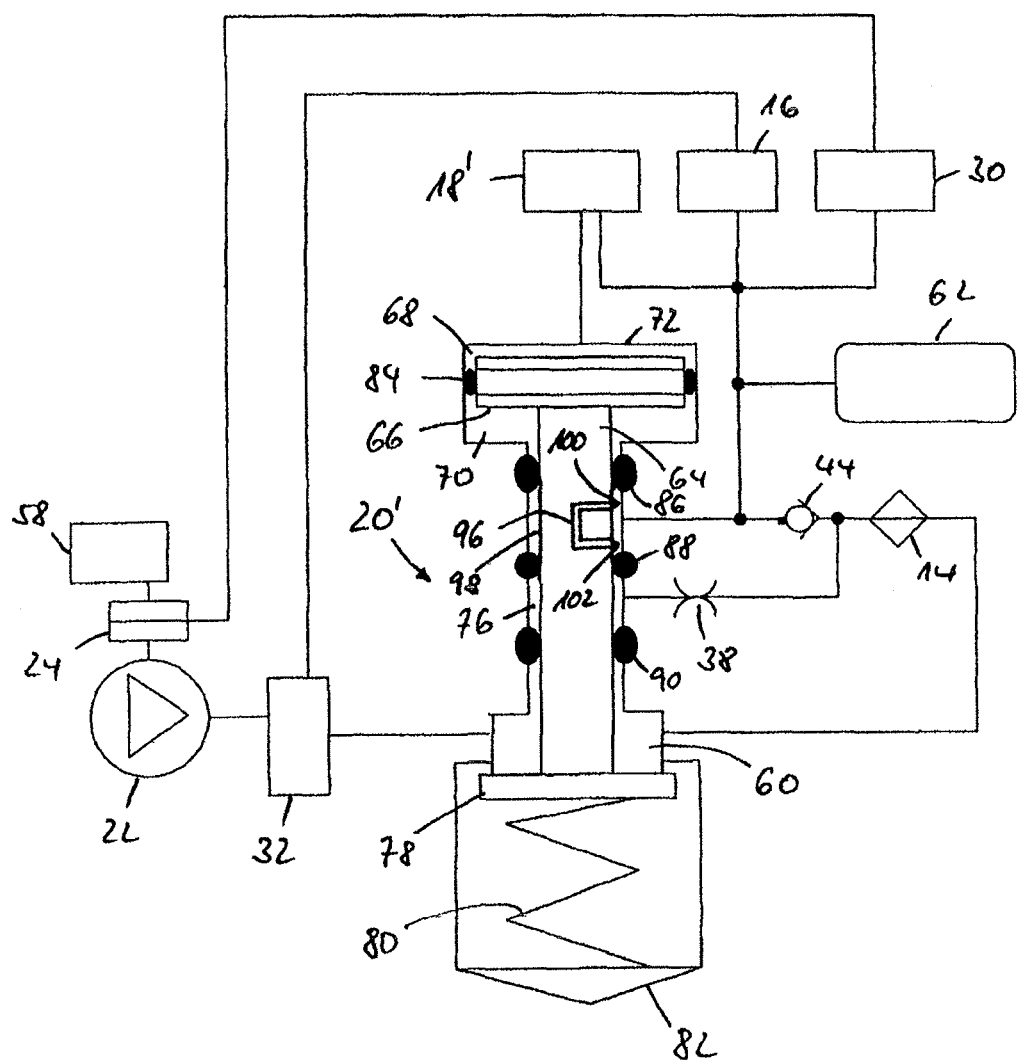
FIG. 3b is a schematic axial section view through a second embodiment of a valve device according to the invention and components connected thereto.

FIG. 3b shows a schematic axial section through a second embodiment of a valve device according to the invention, and components which are connected thereto. The valve device illustrated in FIG. 3b differs from the valve device illustrated in FIG. 3a in that a duct 96 is provided instead of a constriction 74, and in that control piston 64 and valve plate 78 are formed in one piece. In the illustrated switching state, both of the openings 100, 102 of the duct 96 are situated within the first regeneration valve chamber 98, while a pressurization of the control chamber 68 causes the control piston 64 to be moved in such a way that the duct 96 connects the two regeneration valve chambers 76, 98 to one another so as to thereby complete a regeneration air path.

Figure 4:
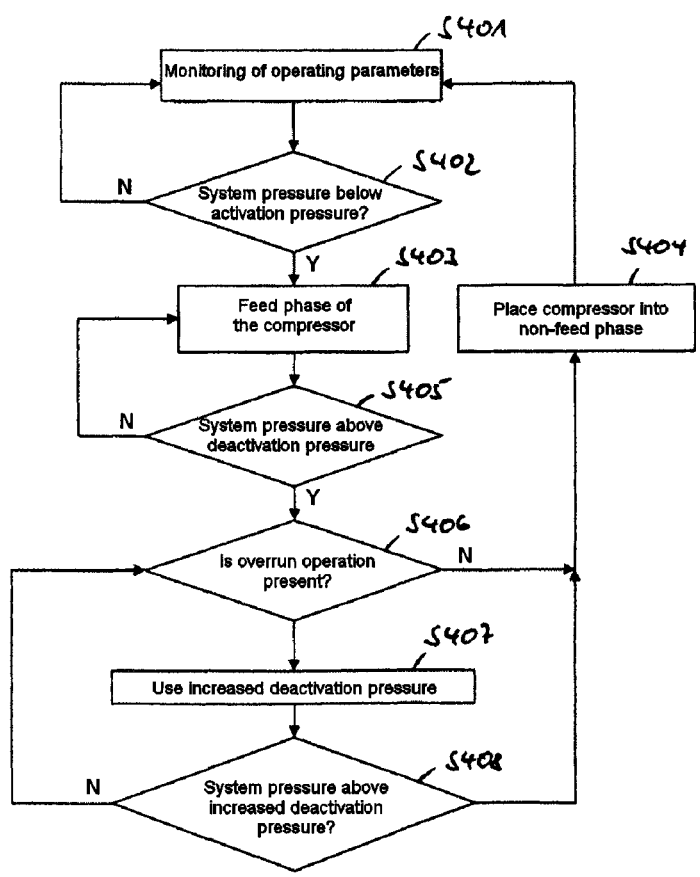
FIG. 4 is a flow diagram for explaining a first method for operating a compressed air supply device.

FIG. 4 shows a flow diagram for explaining a first method for operating a compressed air supply device. In step S401, operating parameters of the utility vehicle are monitored, inter alia the system pressure of the compressed air supply system and the presence of an overrun phase. In step S402, it is determined whether the system pressure lies below a predefined activation pressure threshold. If this is not the case, then the monitoring of the operating parameters is continued in step S401. In contrast, if the system pressure lies below the activation pressure threshold, then in step S403, the compressor is activated so as to feed air. In step S405, it is then determined whether the system pressure lies above a deactivation pressure threshold at which the feed state is normally ended. If the system pressure still lies below the deactivation pressure threshold, then the feed phase of the compressor is continued, as per step S403. If the deactivation pressure threshold has been exceeded, then a deactivation does not take place immediately, but rather it is checked in step S406 whether the utility vehicle is in an overrun phase. Only when it is detected that an overrun operation phase is not present is the compressor placed into a non-feed phase in step S404, whereupon the monitoring of operating parameters is resumed as per step S401. However, if an overrun operation phase is present, then in step S407, the deactivation pressure threshold is set to a higher value, such that the feed phase of the compressor can last longer. In step S408, it is then checked whether the system pressure lies above the increased deactivation pressure threshold. If this is not the case, then the above-described check as to whether overrun operation is present is resumed as per step S406. Only when it is determined, in step S408, that the system pressure now lies above the increased deactivation pressure is the compressor placed into its non-feed phase as per step S404, and the monitoring of operating parameters is resumed in step S401.

Figure 5:
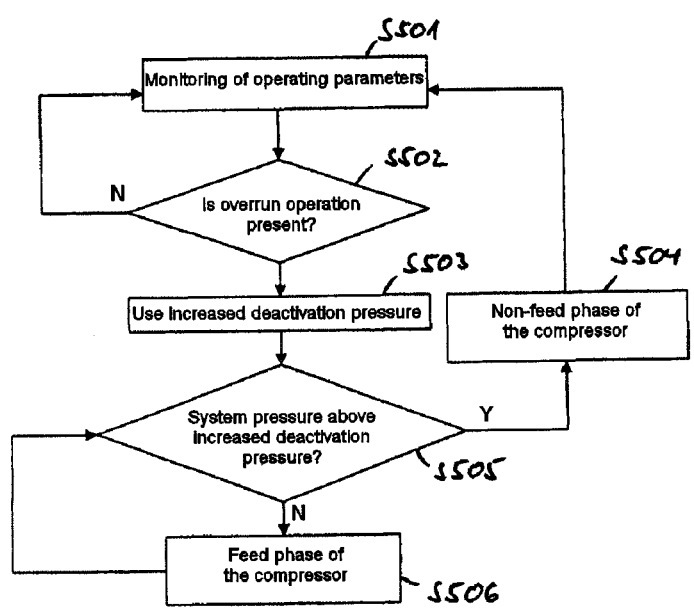
FIG. 5 is a flow diagram for explaining a second method for operating a compressed air supply device.

FIG. 5 shows a flow diagram for explaining a second method for operating a compressed air supply device. While it is the case in the method described in connection with FIG. 4 that the overrun mode is only utilized in an improved way if a feed phase of the compressor is present in any case, it is possible in the yet further improved method as per FIG. 5 for the feed phase to be initiated at any time on the basis of a present overrun mode, as long as pressure requirements, which must be checked, are present at that time. In detail: in step S501, the method again commences from monitoring of the operating parameters. In step S502, it is then checked, independently of the present pressure conditions, as to whether overrun operation is present. If this is not the case, then the operating parameters continue to be monitored as per step S501. However, if overrun operation is present, then in the subsequent step S503, the deactivation pressure threshold is increased. It is then checked in step S505 as to whether the system pressure lies above the increased deactivation pressure. If this is the case, then the non-feed phase of the compressor is maintained as per step S504. However, if the system pressure lies below the increased deactivation pressure threshold, then in step S506, the feed phase of the compressor is initiated, with said feed phase being maintained by means of the cyclical run-through of steps S505 and S506 until the system pressure lies above the increased deactivation pressure. The non-feed phase of the compressor is then initiated as per step S504, and the monitoring of the operating parameters as per step S501 is resumed. The method illustrated in FIG. 5 may be used only in parallel with other monitoring methods. Specifically, it is additionally necessary in any case to monitor the pressure states in the vehicle and, if appropriate, to initiate a feed phase of the compressor on the basis of the pressure states.

The features of the invention disclosed in the above description, in the drawings and in the claims may be essential to the realization of the invention both individually and in any desired combination.

TABLE OF REFERENCE SYMBOLS

10 Compressed air supply system
12 Air dryer unit
14 Filter unit
16 Valve unit
18 Valve unit
18' Valve unit
20 Blow-off valve unit
20' Blow-off valve unit
22 Compressor
24 Coupling
26 Feed line
28 Multi-circuit protective valve unit
30 Compressor coupling switching valve unit
32 Feed line shut-off valve unit
34 Control unit
36 Temperature sensor
38 Throttle
40 Throttle
42 Non-return valve
44 Non-return valve
46 Non-return valve
48 Signal line
50 Signal line
52 Signal line
54 Signal line
56 Signal unit
58 Internal combustion engine
60 Valve chamber
62 Compressed air tank
64 Control piston
66 Control piston plate
68 Control chamber
70 Rear chamber 72 Valve housing
74 Constriction
76 Regeneration valve chamber
78 Valve plate
80 Spring
82 Outlet
84 Seal
86 Seal
88 Seal
90 Seal
94 Control piston
96 Duct
98 Regeneration valve chamber
100 Opening
102 Opening

The invention claimed is:

1. A valve device for a compressed air supply system, comprising:
a control chamber chargeable with compressed air;
a control piston plate delimiting the control chamber;
a control piston attached to one side of the control piston plate that faces away from the control chamber;
a blow-off valve chamber of a blow-off valve, the blow-off valve chamber being provided with at least one compressed air port and having the control piston project into the blow-off valve chamber;
a valve plate delimiting the blow-off valve chamber and being activatable with force in a direction of a valve seat via a spring, the valve plate being liftable off of the valve seat by the control piston counter to the force of the spring in order to open the blow-off valve;
a valve housing surrounding the control piston, the control piston and the valve housing defining at least two regeneration valve chambers of a regeneration valve, each of the regeneration valve chambers having at least one compressed air port and;
wherein the at least two regeneration valve chambers are separable from one another by placing the control piston into a first position and connectable to one another via a passage by placing the control piston into a second position, the passage being formed in or on the control piston, and the at least two regeneration chambers are configured such that when connected, air passing from a first one of the at least two regeneration chambers through the passage to a second one of the at least two regeneration chambers passes out of the second one of the at least two regeneration chambers.

2. The valve device according to claim 1, wherein the blow-off valve is closed when the control piston is in the first position and the blow-off valve is open when the control piston is in the second position.

3. The valve device according to claim 1, wherein the control piston includes at least one constriction, the constriction being situated entirely within one of the at least two regeneration valve chambers in the first position of the control piston and providing said passage between the at least two regeneration valve chambers in the second position of the control piston.

4. The valve device according to claim 1, wherein the control piston defines an axis via a longitudinal extent between the control piston plate and the blow-off valve chamber; and wherein the passage comprises at least one duct having at least two duct openings situated axially offset with respect to one another, being formed in the control piston; and
wherein the at least two duct openings are situated in one of the regeneration valve chambers when the control piston is in its first position and situated in different regeneration valve chambers when the control piston is in its second position so as to provide said passage between the at least two regeneration valve chambers.

5. The valve device according to claim 1, wherein the control piston is separate from the valve plate.

6. The valve device according to claim 1, wherein the control piston is formed in one-piece with the valve plate.

7. The valve device according to claim 1, wherein the blow-off valve chamber includes a second compressed air port.

8. The valve device according to claim 1, wherein the regeneration valve and the blow-off valve are arranged in a single valve housing.

9. A compressed air supply system, comprising:
a valve device, the valve device comprising:
a control chamber chargeable with compressed air;
a control piston plate delimiting the control chamber;
a control piston attached to one side of the control piston plate that faces away from the control chamber;
a blow-off valve chamber of a blow-off valve, the blow-off valve chamber being provided with at least one compressed air port and having the control piston project into the blow-off valve chamber;
a valve plate delimiting the blow-off valve chamber and being activatable with force in a direction of a valve seat via a spring, the valve plate being liftable off of the valve seat by the control piston counter to the force of the spring in order to open the blow-off valve;
a valve housing surrounding the control piston, the control piston and the valve housing defining at least two regeneration valve chambers of a regeneration valve, each of the regeneration valve chambers having at least one compressed air port; and
wherein the at least two regeneration valve chambers are separable from one another by placing the control piston into a first position and connectable to one another via a passage by placing the control piston into a second position, the passage being formed in or on the control piston, and the at least two regeneration chambers are configured such that when connected, air passing from a first one of the at least two regeneration chambers through the passage to a second one of the at least two regeneration chambers passes out of the second one of the at least two regeneration chambers;
a solenoid valve operatively configured to activate the control chamber;
a filter unit having a compressed air inlet coupled to the at least one compressed air port of the blow-off valve chamber; and
a non-return valve connected to a compressed air outlet of the filter unit, wherein the at least two regeneration valve chambers are each connected to one port of the non-return valve.

10. The compressed air supply system according to claim 9, further comprising a compressed air source, wherein a second compressed air port of the blow-off valve chamber is connected to the compressed air source.

* * * * *